United States Patent
Lee et al.

(10) Patent No.: US 9,356,295 B2
(45) Date of Patent: May 31, 2016

(54) CATHODE FOR LITHIUM-AIR BATTERY, METHOD OF MANUFACTURING THE SAME, AND LITHIUM-AIR BATTERY COMPRISING THE SAME

(71) Applicant: KOREA INSTITUTE OF ENERGY RESEARCH, Daejeon (KR)

(72) Inventors: Jong-Won Lee, Daejeon (KR); Kyu-Nam Jung, Daejeon (KR); Kyung-Hee Shin, Seoul (KR); Rak-Hyun Song, Seoul (KR); Seok-Joo Park, Daejeon (KR); Seung-Bok Lee, Daejeon (KR); Tak-Hyoung Lim, Daejeon (KR); Su-Keun Yoon, Daejeon (KR); Ahmer Riaz, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 207 days.

(21) Appl. No.: 13/966,370

(22) Filed: Aug. 14, 2013

(65) Prior Publication Data
US 2014/0315105 A1    Oct. 23, 2014

(30) Foreign Application Priority Data

Apr. 22, 2013    (KR) .................. 10-2013-0044210

(51) Int. Cl.
| | |
|---|---|
| *H01M 12/08* | (2006.01) |
| *H01M 4/86* | (2006.01) |
| *H01M 4/88* | (2006.01) |
| *H01M 4/38* | (2006.01) |

(Continued)

(52) U.S. Cl.
CPC ............ *H01M 4/8621* (2013.01); *H01M 4/382* (2013.01); *H01M 4/8807* (2013.01); *H01M 4/8853* (2013.01); *H01M 4/9016* (2013.01); *H01M 12/08* (2013.01); *H01M 12/06* (2013.01); *H01M 2004/8689* (2013.01); *Y02E 60/50* (2013.01)

(58) Field of Classification Search
CPC . H01M 4/8621; H01M 4/8853; H01M 4/382; H01M 4/9016; H01M 4/8807; H01M 12/08; H01M 12/06; H01M 2004/8689
See application file for complete search history.

(56) References Cited

U.S. PATENT DOCUMENTS

| | | | | |
|---|---|---|---|---|
| 3,922,212 A | * | 11/1975 | Gilchrist | .................. 204/480 |
| 8,349,489 B2 | * | 1/2013 | Morita | ............ H01M 4/5825 |
| | | | | 429/212 |

(Continued)

OTHER PUBLICATIONS

Kwan Su Kim et al., "Catalytic properties of Co3O4 nanoparticles for rechargeable Li/air batteries", Jan. 5, 2012, Nanoscale Research Letters, pp. 1-6.*

(Continued)

*Primary Examiner* — Barbara Gilliam
*Assistant Examiner* — Angela Martin
(74) *Attorney, Agent, or Firm* — LEX IP MEISTER, PLLC

(57) ABSTRACT

This invention relates to a cathode for a lithium-air battery, a method of manufacturing the same and a lithium-air battery including the same. The method of manufacturing the cathode for a lithium-air battery includes 1) stirring a cobalt salt, triethanolamine and distilled water, thus preparing a cobalt solution, 2) electroplating the cobalt solution on a porous support, thus preparing a cobalt plated porous support, 3) reacting the cobalt plated porous support with a mixture solution including oxalic acid, water and ethanol, thus forming cobalt oxalate on the porous support, and 4) thermally treating the cobalt oxalate.

14 Claims, 8 Drawing Sheets

(51) Int. Cl.
*H01M 4/90* (2006.01)
*H01M 12/06* (2006.01)

(56) References Cited

U.S. PATENT DOCUMENTS

2013/0089791 A1* 4/2013 Chang et al. ............... 429/231.8
2013/0141050 A1* 6/2013 Visco et al. .................. 320/130
2015/0024292 A1* 1/2015 Yamada et al. .............. 429/405

OTHER PUBLICATIONS

Lawrence Suchow, "A detailed, simple crystal field consideration of the normal spinel structure of Co3O4", 1976, Journal of Chemical Education, ACS Publications, p. 560.*
Kwan Su Kim et al., "Catalytic properties of Co3O4 nanoparticles for rechargeable Li/air batteries", Nanoscale Research Letters 2012, Jan. 5, 2012, pp. 1-6.

* cited by examiner

CATHODE FOR LITHIUM-AIR BATTERY, METHOD OF MANUFACTURING THE SAME, AND LITHIUM-AIR BATTERY COMPRISING THE SAME

BACKGROUND OF THE INVENTION

1. Field of the Invention

The present invention relates to a cathode for a lithium-air battery and a lithium-air battery comprising the same, and more particularly, to a cathode for a lithium-air battery, which may lower the charge voltage of a lithium-air battery, thus enabling the lithium-air battery to have improved energy efficiency and superior cycle life of charge and discharge, and to a method of manufacturing the same and a lithium-air battery comprising the same.

2. Description of the Related Art

A lithium-air battery indicates a battery that uses lithium (Li) metal as an anode and oxygen ($O_2$) in air as a cathode active material, and is a novel energy storage system able to substitute for a conventional lithium ion battery. This lithium-air battery is a battery system wherein oxidation/reduction of lithium at an anode and reduction/oxidation of oxygen supplied from the outside at a cathode occur and also wherein secondary battery and fuel cell technologies are combined. The theoretical energy density of the lithium-air battery is 11,140 Wh/kg, which is much higher than those of other secondary batteries.

The lithium-air battery typically includes an anode, a cathode, and an electrolyte and a separator between the anode and the cathode. The cathode is typically composed of porous carbon and a binder. However, the carbon material reacts with lithium peroxide ($Li_2O_2$) produced during discharge of the lithium-air battery, and promotes the decomposition of an organic electrolyte, thus forming byproducts such as lithium carbonate ($Li_2CO_3$), etc. Also, the binder used to manufacture the cathode is known to decompose due to the reaction with lithium peroxide. Thereby, the lithium-air battery is disadvantageous because its charge voltage is very high and charge and discharge energy efficiencies are remarkably low, and the life of the battery is very short due to byproducts which continuously accumulate during the cycle. Therefore, the development of a cathode able to decrease the charge voltage of a lithium-air battery and to increase the cycle life, without including carbon and a binder, is required.

SUMMARY OF THE INVENTION

Accordingly, the present invention has been made keeping in mind the above problems encountered in the related art, and an object of the present invention is to provide a cathode for a lithium-air battery, a method of manufacturing the same and a lithium-air battery comprising the same, wherein cobalt oxide having a spinel structure is used as a cathode, instead of porous carbon and a binder which are typically used in the lithium-air battery, thus lowering the charge voltage of the lithium-air battery, thereby enabling the lithium-air battery to have improved energy efficiency and superior cycle life of charge and discharge.

The present invention provides a method of manufacturing a cathode for a lithium-air battery, comprising 1) stirring a cobalt salt, triethanolamine and distilled water, thus preparing a cobalt solution; 2) electroplating the cobalt solution on a porous support, thus preparing a cobalt plated porous support; 3) reacting the cobalt plated porous support with a mixture solution comprising oxalic acid, water and ethanol, thus forming cobalt oxalate on the porous support; and 4) thermally treating the cobalt oxalate.

The method of manufacturing the cathode for a lithium-air battery may further comprise cooling a product obtained in 4).

The concentration of the cobalt salt is preferably 0.05~0.5 M based on distilled water.

The concentration of the triethanolamine is preferably 0.1~1 M based on distilled water.

The porous support may be provided in the form of, for example, foam, mesh or foil having holes.

The electroplating is preferably performed at a current of 1~100 mA cm$^{-2}$.

The volume ratio of water relative to ethanol in the mixture solution is preferably 0.01~0.5, and more preferably 0.03~0.3.

In addition, the present invention provides a cathode for a lithium-air battery, comprising cobalt oxide having a spinel structure.

The shape of cobalt oxide is preferably selected from the group consisting of a needle shape, a plate shape and a flower shape.

In addition, the present invention provides a cathode for a lithium-air battery, manufactured using the above method.

In addition, the present invention provides a lithium-air battery, comprising the cathode for a lithium-air battery as above; an anode comprising lithium metal or a lithium alloy; a separator disposed between the cathode and the anode; and an electrolyte.

The separator may be selected from the group consisting of glass fibers, polyester, Teflon, polyethylene, polypropylene and polytetrafluoroethylene (PTFE).

The electrolyte may comprise a solvent and a lithium salt.

The solvent may be selected from the group consisting of propylene carbonate, ethylene carbonate, fluoroethylene carbonate, diethyl carbonate, ethylmethyl carbonate, methylpropyl carbonate, butylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethyl carbonate, methylethyl carbonate, diethyl carbonate, methylpropyl carbonate, methylisopropyl carbonate, ethylpropyl carbonate, dipropyl carbonate, dibutyl carbonate, diethyleneglycol, dimethylether, dimethyldiglycol, dimethyltriglycol and dimethyltetraglycol.

The lithium salt may be selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are a natural number), LiCl and LiI.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Figure 1:
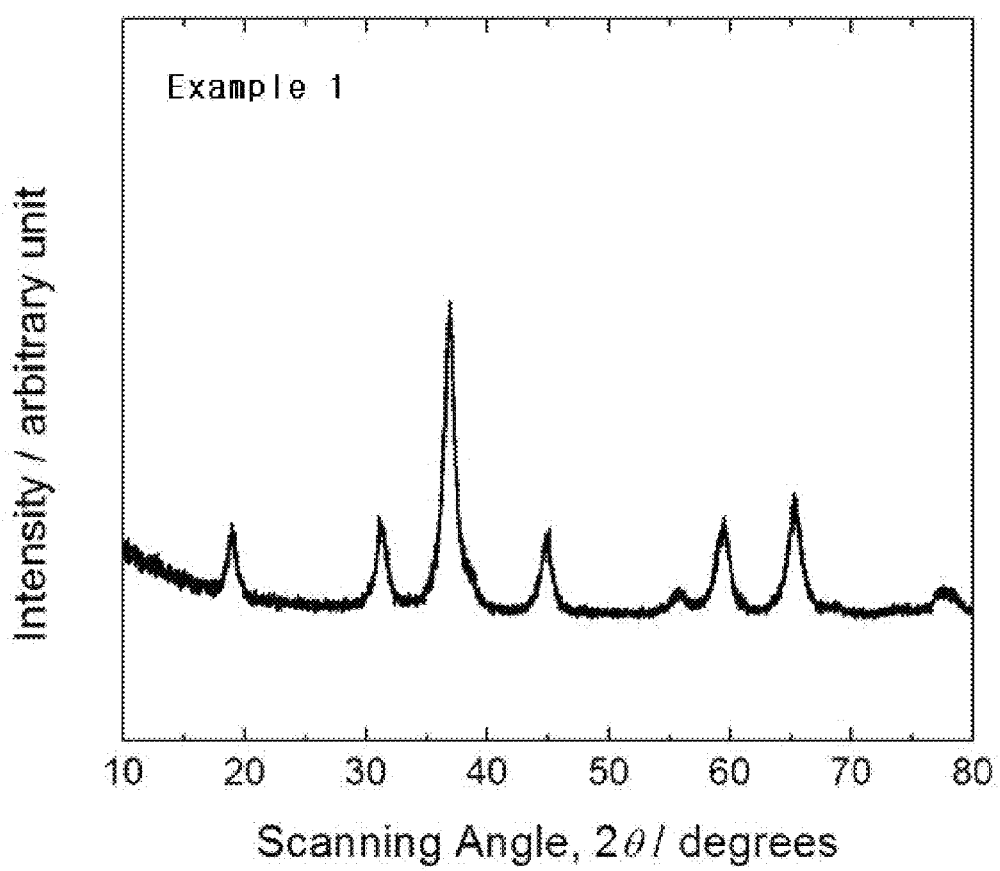
FIG. 1 illustrates the X-ray diffraction pattern of a cathode manufactured in Example 1.

Hereinafter, a detailed description will be given of the present invention. In the description of the present invention, a detailed description of the related known configurations or functions may be omitted.

The advantages and features of the present invention and the methods able to achieve them will be more clearly understood from the following detailed description of the preferred embodiments with reference to the appended drawings. However, the present invention is not limited to the embodiments described herein but may be embodied variously. The embodiments of the invention are rather provided so that the disclosed contents become thorough and complete and the spirit of the present invention may be sufficiently transferred to those skilled in the art. For the sake of clear description, the thicknesses of layers and regions in the drawings are depicted to be exaggerated.

The terms used in this application are merely used to express specific embodiments, and are not construed as limiting the present invention. Unless otherwise stated, the singular expression includes a plural expression. In this application, the terms "include" and "have" are used to designate the presence of features, numbers, steps, operations, components, parts or combinations thereof described in the specification, not intending to exclude the presence or additional possibility of one or more different features, numbers, steps, operations, components, parts or combinations thereof.

Unless otherwise defined, all the terms used herein including technical or scientific terms have the same meanings as those typically understood by those skilled in the art. The general terms defined in dictionaries should be understood as meanings which coincide with the meanings in the contexts of related technologies, and are not construed as ideal or excessively formal meanings, unless otherwise defined explicitly.

The embodiments described in this specification and the configurations shown in the drawings are preferred embodiments of the present invention, and do not represent all of the technical ideas of the present invention and thus a variety of equivalents and modifications able to substituted therefor may be provided at the point of time of the present invention being filed.

According to the present invention, a method of manufacturing a cathode for a lithium-air battery includes 1) stirring a cobalt salt, triethanolamine and distilled water, thus preparing a cobalt solution; 2) electroplating the cobalt solution on a porous support, thus preparing a cobalt plated porous support; 3) reacting the cobalt plated porous support with a mixture solution comprising oxalic acid, water and ethanol, thus forming cobalt oxalate on the porous support; and 4) thermally treating the cobalt oxalate.

In the method of manufacturing the cathode for a lithium-air battery according to the present invention, a cobalt salt, triethanolamine and distilled water are stirred, thus preparing the cobalt solution (Step 1)).

Examples of the cobalt salt may include cobalt nitrate, cobalt chloride, cobalt acetate, cobalt acetylacetonate, etc.

Triethanolamine enables the cobalt layer to be uniformly plated, and triethanolamine adsorbed to the cobalt layer functions to one-dimensionally selectively grow cobalt oxalate.

The cobalt salt preferably has a concentration of 0.05~0.5 M.

As such, if the concentration of the cobalt salt is less than the above lower limit or exceeds the above upper limit, a uniform cobalt plating layer cannot be formed, which is undesirable.

The concentration of triethanolamine is preferably 0.1~1 M.

As such, if the concentration of triethanolamine is less than the above lower limit or exceeds the above upper limit, a uniform cobalt plating layer cannot be formed, and it is difficult to prepare nano-structured cobalt oxalate and cobalt oxide.

Subsequently, the cobalt solution prepared in Step 1) is electroplated on the porous support, thus preparing the cobalt plated porous support (Step 2)).

The porous support may be provided in the form of a porous structure, including foam, mesh, foil having holes, etc., using a material such as metal having electronic conductivity, a polymer, an inorganic material and so on.

The electroplating is preferably performed at a current of 1~100 mA cm$^{-2}$.

As such, if the current of the electroplating is less than the above lower limit, the plating rate may become very low. In contrast, if the current of the electroplating exceeds the above upper limit, a uniform cobalt plating layer cannot be formed, which is undesirable.

Subsequently, the cobalt plated porous support prepared in Step 2) is reacted with the mixture solution comprising oxalic acid, water and ethanol, thus forming cobalt oxalate on the porous support (Step 3)).

The volume ratio of water relative to ethanol in the mixture solution is preferably 0.01~0.5, and more preferably 0.03~0.3.

If the volume ratio of water relative to ethanol is less than the above lower limit, it is difficult to manufacture a porous structure. In contrast, if the volume ratio of water relative to ethanol exceeds the above upper limit, the surface area of the electrode may decrease, which is undesirable.

In this step, cobalt oxalate is produced via chemical reaction between the cobalt ion dissolved from the cobalt plating layer and the dissociated oxalic acid ion, and oxalic acid is not dissociated in the form of an ion in ethanol but is dissociated only in the presence of water. Also, the cobalt ion may be dissolved from the cobalt plating layer only in the presence of water. Hence, the extent of dissociation of oxalic acid and the extent of dissolution of cobalt ion are determined depending on the volume ratio of water and ethanol, and thereby the shapes of cobalt oxalate and cobalt oxide may vary.

In the above mixture solution, the concentration of oxalic acid relative to a mixture solution of water and ethanol is preferably 0.05~1 M. If the concentration thereof is less than the above lower limit, the surface area of the electrode may decrease, which is undesirable. In contrast, if the concentration thereof exceeds the above upper limit, it is difficult to manufacture a porous structure, which is undesirable.

Subsequently, cobalt oxalate formed in Step 3) is thermally treated (Step 4)). In this step, thermal treatment of cobalt oxalate is preferably performed at 180~500° C. for 0.5~5 hr in an air atmosphere.

Cobalt oxide having a spinel structure may be manufactured using the above method, and cobalt oxide having a spinel structure may be effectively utilized in manufacturing a cathode for a lithium-air battery.

This cobalt oxide may have, for example, a needle shape, a plate shape or a flower shape. The surface area and the internal porous structure of the cathode may vary considerably depending on the shape of cobalt oxide. In the case where cobalt oxide has the above shape, the electrochemical active area for oxygen reaction is the largest, and the number of pores in which $Li_2O_2$ formed upon discharge may accumulate is high, thus attaining the greatest discharge capacity.

A lithium-air battery comprising the cathode as above may be manufactured as follows.

The cathode of the present invention is manufactured as mentioned above.

Subsequently, an anode is manufactured using an active material such as lithium metal, a lithium alloy, etc. which are typically used in the art.

The cathode and the anode may be separated by means of a separator, and any separator may be used so long as it is typically useful in a lithium battery. Particularly useful is a separator having low resistance to ion movement of an electrolyte and high electrolyte uptake.

The separator is selected from among, for example, glass fibers, polyester, Teflon, polyethylene, polypropylene, polytetrafluoroethylene (PTFE) and combinations thereof, and may be provided in the form of nonwoven fabric or woven fabric. Specifically, a separator which is rollable, such as polyethylene, polypropylene, etc., or a separator having high organic electrolyte uptake, may be used.

The electrolyte used in the lithium battery may include a solvent and a lithium salt, and examples of the solvent may include propylene carbonate, ethylene carbonate, fluoroethylene carbonate, diethyl carbonate, ethylmethyl carbonate, methylpropyl carbonate, butylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethyl carbonate, methylethyl carbonate, diethyl carbonate, methylpropyl carbonate, methylisopropyl carbonate, ethylpropyl carbonate, dipropyl carbonate, dibutyl carbonate, diethyleneglycol, dimethylether, dimethyldiglycol, dimethyltriglycol, dimethyltetraglycol, etc., and examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are a natural number), LiCl and LiI.

Subsequently, a separator impregnated with an electrolyte is disposed between the cathode plate and the anode plate, thus forming a lithium-air battery structure.

The lithium-air battery is suitable for use in fields requiring high capacity, such as electric vehicles, and may also be utilized in hybrid vehicles and so on by being combined with conventional internal combustion engines, fuel cells, supercapacitors, etc. Furthermore, the lithium-air battery may be employed in other uses requiring high capacity, such as mobile phones, portable computers, etc.

A better understanding of the present invention may be obtained via the following examples which are set forth to illustrate, but are not to be construed as limiting the present invention, which is apparent to those skilled in the art.

EXAMPLE 1

1. Manufacture of Cathode

Cobalt sulfate and triethanolamine were dissolved in distilled water, thus preparing a mixture solution. As such, the concentration of cobalt sulfate relative to distilled water was 0.26 M, and the concentration of triethanolamine relative to distilled water was 0.53 M. As a porous support, a nickel foam was adopted. The nickel foam was used as a working electrode, and a platinum mesh was used as a counter electrode, and a current of 10 mA cm$^{-2}$ was applied for 250 sec, so that metal cobalt was electroplated on the nickel foam from the above solution. Subsequently, oxalic acid was dissolved in a mixture solution of water and ethanol. As such, the volume ratio of water/ethanol in the mixture solution was 0.1, and the concentration of oxalic acid relative to the mixture solution was 0.3 M. The nickel foam plated with metal cobalt was immersed in the mixture solution for 90 min, and dried, thus manufacturing cobalt oxalate on the nickel foam. The cobalt oxalate was brought into contact with dry air at 250° C. for 2 hr so as to be thermally treated, and then subjected to furnace cooling, thus manufacturing cobalt oxide on the nickel foam.

2. Manufacture of Lithium-air Battery

A lithium-air battery was manufactured using the cathode, a lithium counter electrode, a glass fiber separator, and an electrolyte having 1M $Li(CF_3SO_2)_2N$ dissolved in dimethyltetraglycol.

EXAMPLE 2

A cathode and a lithium-air battery were manufactured in the same manner as in Example 1, with the exception that the volume ratio of water/ethanol in the mixture solution of oxalic acid/water/ethanol was 0.03.

EXAMPLE 3

A cathode and a lithium-air battery were manufactured in the same manner as in Example 1, with the exception that the volume ratio of water/ethanol in the mixture solution of oxalic acid/water/ethanol was 0.05.

EXAMPLE 4

A cathode and a lithium-air battery were manufactured in the same manner as in Example 1, with the exception that the volume ratio of water/ethanol in the mixture solution of oxalic acid/water/ethanol was 0.3.

EXAMPLE 5

A cathode and a lithium-air battery were manufactured in the same manner as in Example 1, with the exception that the nickel foam plated with metal cobalt was immersed in the mixture solution of oxalic acid/water/ethanol for 60 min.

COMPARATIVE EXAMPLE 1

(Manufacture of Cathode)

Carbon black (Denka Black) and a PVdF binder were mixed at a weight ratio of 80:20, thus preparing a slurry. This slurry was applied on a nickel mesh, dried at 80° C. and then vacuum dried at 120° C., thus manufacturing a cathode plate.

(Manufacture of Lithium-air Battery)

A lithium-air battery was manufactured using the cathode plate, a lithium counter electrode, a glass fiber separator, and an electrolyte having 1M $Li(CF_3SO_2)_2N$ dissolved in dimethyltetraglycol.

TEST EXAMPLE 1

X-ray Diffraction Test

In order to evaluate the crystalline structure of the cathode of Example 1, an X-ray diffraction test was performed. The test results are shown in FIG. 1. As seen in FIG. 1, the cobalt oxide cathode manufactured in Example 1 had a spinel structure, and had neither a secondary phase nor an impurity phase.

TEST EXAMPLE 2

TEM Test

Figure 2:
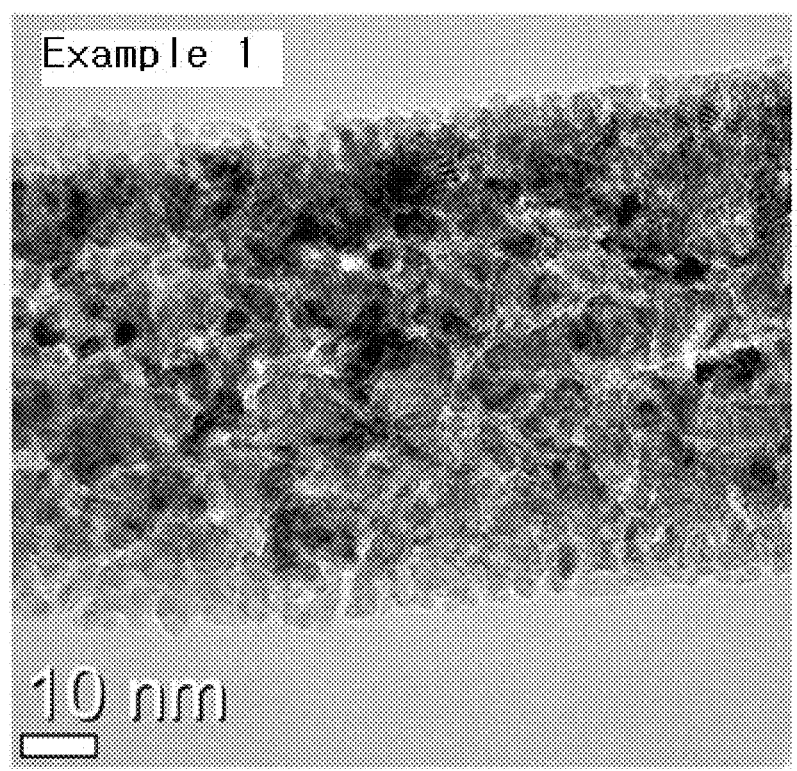
FIG. 2 illustrates a transmission electron microscope (TEM) image of the cathode manufactured in Example 1.

In order to evaluate the shape and crystalline structure of the cathode of Example 1, a TEM test was performed. The test results are shown in FIG. 2. As seen in FIG. 2, a large number of nanopores were present on and in the cobalt oxide. Also, the manufactured cobalt oxide had a polycrystalline structure comprising small crystal grains having a size of 2~5 nm.

TEST EXAMPLE 3

SEM Test

Figure 3:
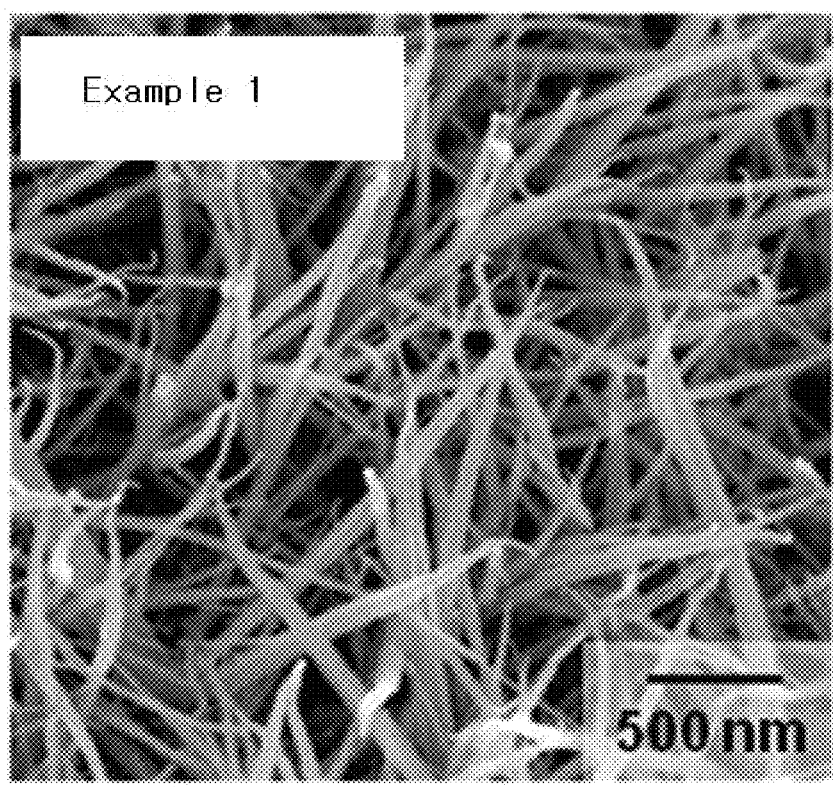
FIG. 3 illustrates a scanning electron microscope (SEM) image of the cathode manufactured in Example 1.
Figure 4:
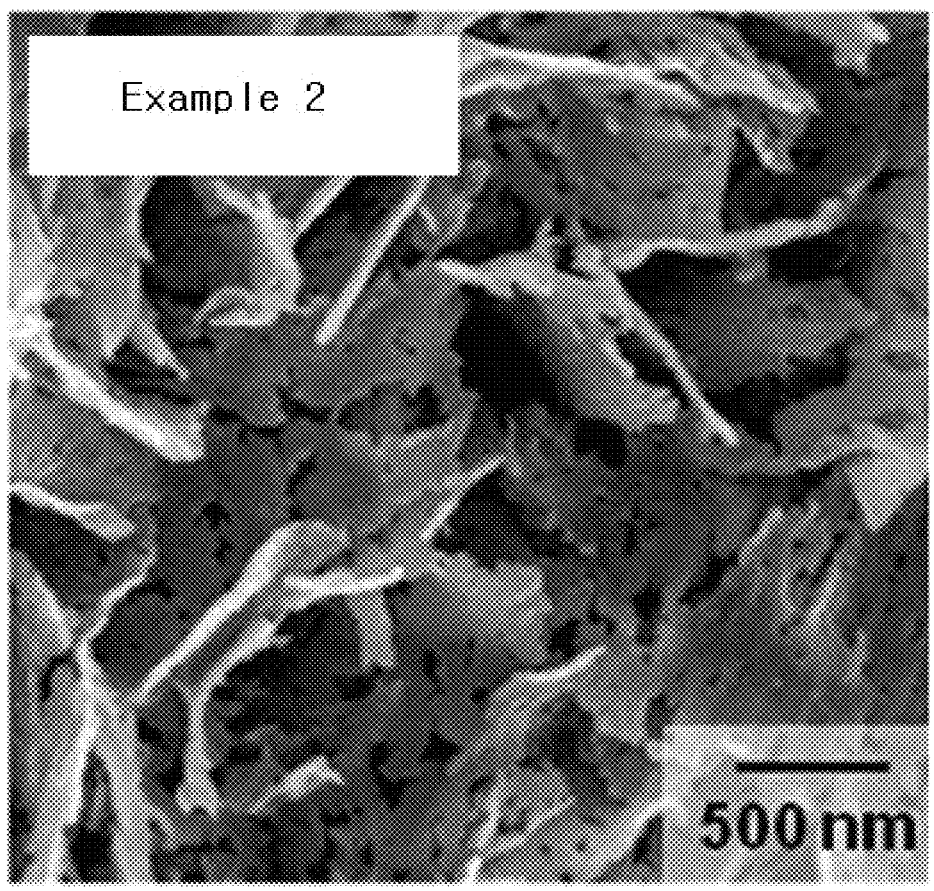
FIG. 4 illustrates a SEM image of a cathode manufactured in Example 2.
Figure 5:
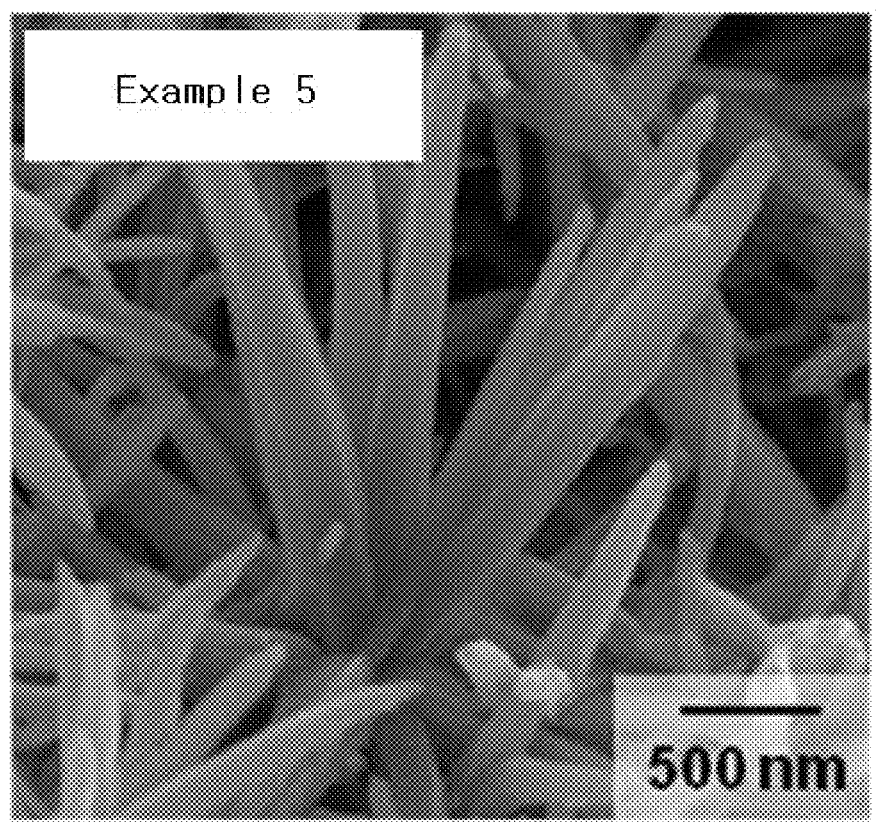
FIG. 5 illustrates a SEM image of a cathode manufactured in Example 5.

In order to evaluate the shape of the cathode of Examples 1, 2 and 5, a SEM test was performed. The test results are shown in FIGS. 3 to 5. As seen in FIGS. 3 to 5, in the case where the volume ratio of water/ethanol was lowered, the shape of cobalt oxide was changed from a needle shape to a plate shape. Also, in the case where the immersion time in the mixture solution of oxalic acid/water/ethanol was decreased, the shape of cobalt oxide was changed from a needle shape to a flower shape.

TEST EXAMPLE 4

Charge and Discharge Test

A charge-discharge test was performed using the lithium-air batteries of Examples 1 to 5 and Comparative Example 1. Specifically, discharge was performed up to 2.0 V at a constant current of 20 mA/g, after which charge was performed up to 4.2 or 4.6 V at a constant current of 20 mA/g. As such, the applied current density was calculated based on the weight of the cathode.

Figure 6:
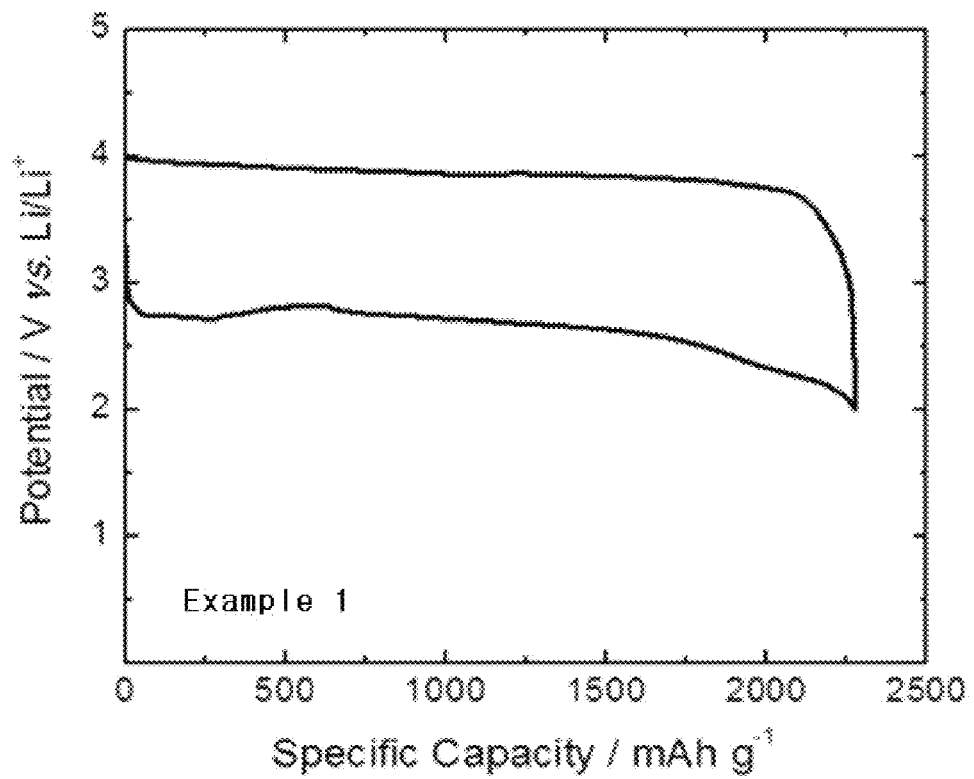
FIG. 6 illustrates a charge-discharge curve of a lithium-air battery manufactured in Example 1.
Figure 7:
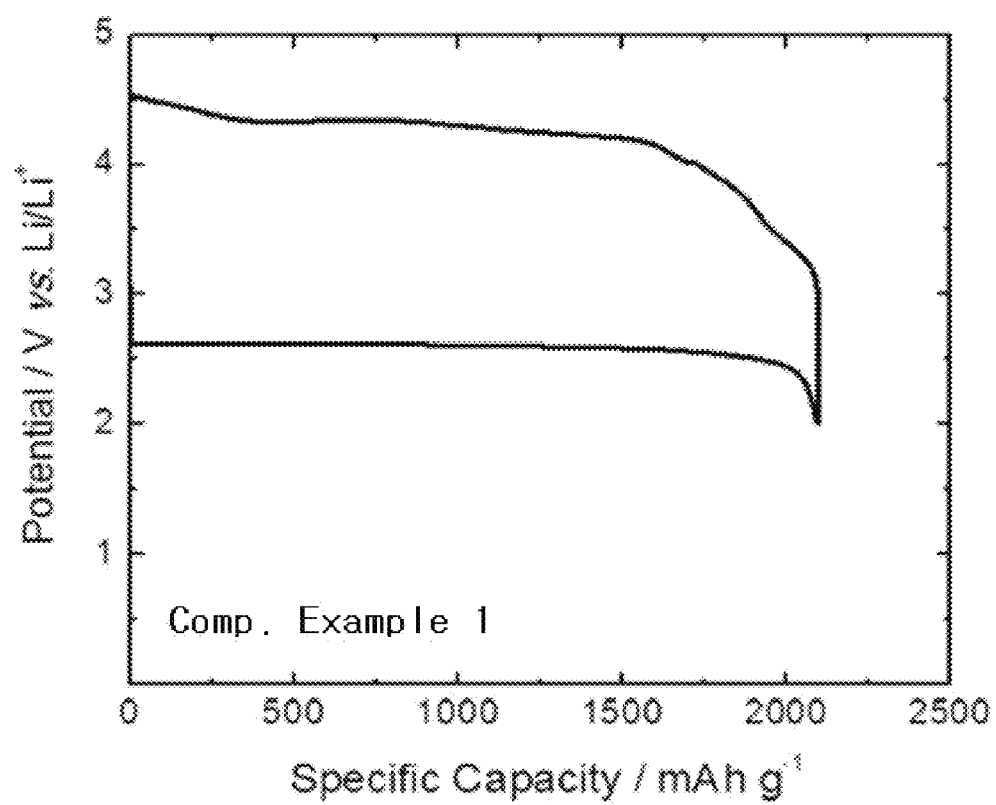
FIG. 7 illustrates a charge-discharge curve of a lithium-air battery manufactured in Comparative Example 1.

FIGS. 6 and 7 illustrate the charge-discharge curves of the lithium-air batteries of Example 1 and Comparative Example 1. As such, the capacity was calculated based on the weight of the cathode. The lithium-air battery of Example 1 using the cobalt oxide cathode without carbon and a binder exhibited a lower charge voltage, compared to that of Comparative Example 1. Table 1 below summarizes the capacity, charge voltage and charge-discharge efficiency of the lithium-air batteries of Examples 1 to 5 and Comparative Example 1.

TABLE 1

Capacity, charge voltage and charge-discharge efficiency of lithium-air batteries of Examples 1 to 5 and Comparative Example 1

|  | Capacity (mAh/g) | Charge voltage (V) | Energy efficiency (—) |
|---|---|---|---|
| Ex. 1 | 2,280 | 3.88 | 71 |
| Ex. 2 | 1,127 | 3.87 | 71 |
| Ex. 3 | 1,846 | 3.89 | 71 |
| Ex. 4 | 1,642 | 3.90 | 70 |
| Ex. 5 | 1,930 | 3.92 | 70 |
| Comp. Ex. 1 | 2,097 | 4.35 | 60 |

TEST EXAMPLE 5

Cycle Test

A charge-discharge cycle test was performed using the lithium-air batteries of Example 1 and Comparative Example 1. Specifically, discharge was performed until the capacity reached 500 mAh/g at a constant current of 100 mA/g, after which charge was performed until the capacity reached 500 mAh/g at a constant current of 100 mA/g. As such, the applied current density was calculated based on the weight of the cathode.

Figure 8:
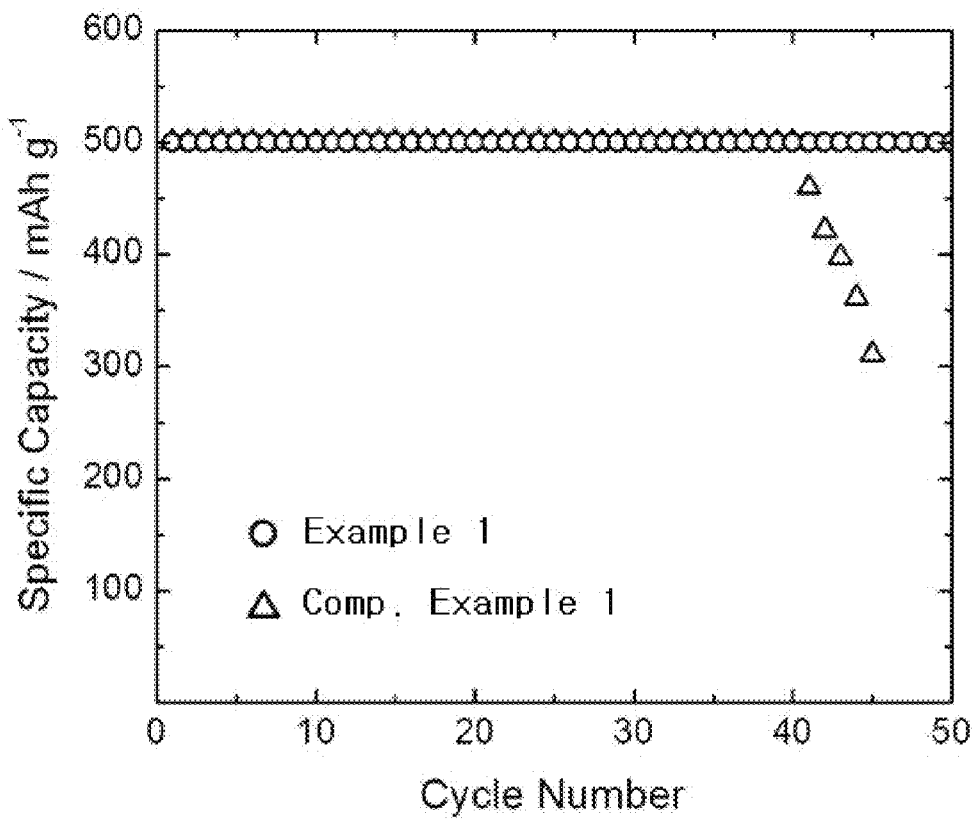
FIG. 8 illustrates cycle properties (discharge capacity-cycle number) of the lithium-air batteries of Example 1 and Comparative Example 1.

FIG. 8 illustrates the capacity during the cycle test of the lithium-air batteries of Example 1 and Comparative Example 1. The lithium-air battery of Example 1 using the cathode without carbon and a binder exhibited superior cycle properties compared to that of Comparative Example 1.

Accordingly, the cobalt oxide cathode having a spinel structure according to the present invention contains neither carbon nor a binder which cause side reactions, thus improving the energy efficiency and cycle life of charge and discharge of the lithium-air battery.

As described hereinbefore, the present invention provides a cathode for a lithium-air battery, a method of manufacturing the same and a lithium-air battery comprising the same. According to the present invention, the cathode for a lithium-air battery includes cobalt oxide having a spinel structure, instead of porous carbon and a binder which are typically used in a lithium-air battery, thus lowering the charge voltage of the lithium-air battery and increasing the cycle life of charge and discharge, thereby improving energy efficiency.

The embodiments of the present invention have been disclosed in the specification and drawings, and specific terms used herein are merely regarded as general meanings to easily explain the technical contents of the present invention and to aid the understanding of the present invention, and are not construed to limit the present invention.

Those skilled in the art will appreciate that the present invention may be carried out in the other specific forms without departing from the technical spirit or essential features thereof. Accordingly, it is to be understood that the embodiments described herein are illustrative and are not limited.

What is claimed is:

1. A method of manufacturing a cathode for a lithium-air battery, comprising:
   1) stirring a cobalt salt, triethanolamine and distilled water, thus preparing a cobalt solution;
   2) electroplating the cobalt solution on a porous support, thus preparing a cobalt plated porous support;
   3) reacting the cobalt plated porous support with a mixture solution comprising oxalic acid, water and ethanol, thus forming cobalt oxalate on the porous support; and
   4) thermally treating the cobalt oxalate.

2. The method of claim 1, further comprising cooling a product obtained in 4).

3. The method of claim 1, wherein a concentration of the cobalt salt is 0.05~0.5 M based on the distilled water.

4. The method of claim 1, wherein a concentration of the triethanolamine is 0.1~1 M based on the distilled water.

5. The method of claim 1, wherein the porous support is provided in a form of foam, mesh or foil having holes.

6. The method of claim 1, wherein the electroplating is performed at a current of 1~100 mA cm$^{-2}$.

7. The method of claim 1, wherein a volume ratio of the water relative to the ethanol in the mixture solution is 0.01~0.5.

8. The method of claim 1, wherein a volume ratio of the water relative to the ethanol in the mixture solution is 0.03~0.3.

9. A cathode for a lithium-air battery, manufactured using the method of claim 1.

10. A lithium-air battery, comprising:
the cathode for a lithium-air battery of claim 9;
an anode comprising lithium metal or a lithium alloy;
a separator disposed between the cathode and the anode; and
an electrolyte.

11. The lithium-air battery of claim 10, wherein the separator is selected from the group consisting of glass fibers, polyester, Teflon, polyethylene, polypropylene and polytetrafluoroethylene (PTFE).

12. The lithium-air battery of claim 10, wherein the electrolyte comprises a solvent and a lithium salt.

13. The lithium-air battery of claim 12, wherein the solvent is selected from the group consisting of propylene carbonate, ethylene carbonate, fluoroethylene carbonate, diethyl carbonate, ethylmethyl carbonate, methylpropyl carbonate, butylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethyl carbonate, methylethyl carbonate, diethyl carbonate, methylpropyl carbonate, methylisopropyl carbonate, ethylpropyl carbonate, dipropyl carbonate, dibutyl carbonate, diethyleneglycol, dimethylether, dimethyldiglycol, dimethyltriglycol and dimethyltetraglycol.

14. The lithium-air battery of claim 12, wherein the lithium salt is selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are a natural number), LiCl and LiI.

* * * * *